United States Patent
Carloff et al.

(10) Patent No.: US 8,585,275 B2
(45) Date of Patent: Nov. 19, 2013

(54) DEGASSING EXTRUDER FOR DEGASSING A POLYMER MATERIAL AND METHOD FOR DEGASSING A SYRUP CONSISTING OF POLYMERS, SOLVENTS AND/OR MONOMERS USING A DEGASSING EXTRUDER

(75) Inventors: Ruediger Carloff, Darmstadt (DE); Joachim Heid, Fraenkisch-Crumbach (DE); Heinz Vetter, Rossdorf (DE)

(73) Assignee: Evonik Roehm GmbH, Darmstadt (DE)

( * ) Notice: Subject to any disclaimer, the term of this patent is extended or adjusted under 35 U.S.C. 154(b) by 412 days.

(21) Appl. No.: 12/678,195

(22) PCT Filed: Aug. 12, 2008

(86) PCT No.: PCT/EP2008/060574
§ 371 (c)(1),
(2), (4) Date: Mar. 15, 2010

(87) PCT Pub. No.: WO2009/040189
PCT Pub. Date: Apr. 2, 2009

(65) Prior Publication Data
US 2010/0193988 A1 Aug. 5, 2010

(30) Foreign Application Priority Data
Sep. 20, 2007 (DE) .................... 10 2007 045 156

(51) Int. Cl.
*B29C 47/38* (2006.01)
(52) U.S. Cl.
USPC .............................. 366/75; 366/100; 425/203
(58) Field of Classification Search
USPC ..................... 366/75, 100; 425/203
See application file for complete search history.

(56) References Cited

U.S. PATENT DOCUMENTS

| 3,156,009 A | 11/1964 | Alsys |
| 3,383,015 A | 5/1968 | Miler |
| 3,563,514 A * | 2/1971 | Shattuck ................ 366/75 |
| 3,787,160 A | 1/1974 | Leister |
| 3,797,550 A | 3/1974 | Latinen |
| 4,365,081 A | 12/1982 | Shimizu et al. |
| 4,959,186 A | 9/1990 | Dollhopf et al. |
| 5,185,060 A | 2/1993 | Yamasaki et al. |
| 5,897,690 A | 4/1999 | McGrew |

FOREIGN PATENT DOCUMENTS

| CH | 451 497 | 5/1968 |
| EP | 0 015 457 | 9/1980 |
| EP | 0 343 280 | 11/1989 |
| JP | 58 147332 | 9/1983 |

OTHER PUBLICATIONS

U.S. Appl. No. 12/678,186, filed Mar. 15, 2010, Carloff, et al.

* cited by examiner

*Primary Examiner* — David Sorkin
(74) *Attorney, Agent, or Firm* — Oblon, Spivak, McClelland, Maier & Neustadt, L.L.P.

(57) ABSTRACT

The invention relates to a vented extruder (1) for the devolatilization of a polymer material, encompassing at least one extruder barrel (2) with at least one rotatably driven extruder screw (3) mounted in the extruder barrel (2), and with at least one material feed and with at least one extrudate outlet, and also with at least one vent zone (9). A particular feature of the vented extruder (1) is that the gas output for the gas arising in the vent zone (9) has been provided upstream of the material feed, in relation to the direction of conveying of the polymer material.

27 Claims, 2 Drawing Sheets

Figure 1:
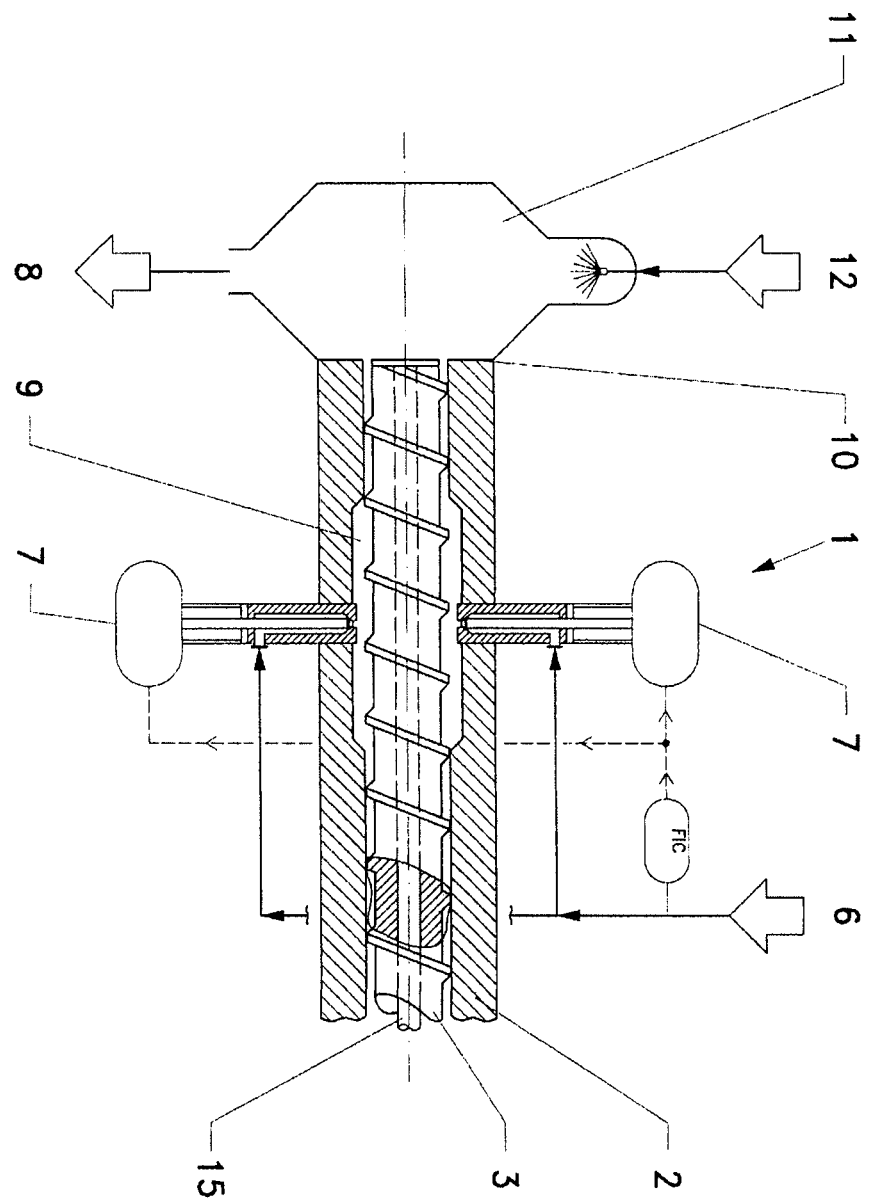

DEGASSING EXTRUDER FOR DEGASSING A POLYMER MATERIAL AND METHOD FOR DEGASSING A SYRUP CONSISTING OF POLYMERS, SOLVENTS AND/OR MONOMERS USING A DEGASSING EXTRUDER

This application is a National Stage of PCT/EP08/060574 filed Aug. 12, 2008 and claims the benefit of DE 10 2007 045 156.5 filed Sep. 20, 2007.

FIELD OF THE INVENTION

The invention relates to a vented extruder for the devolatilization of a polymer material, encompassing at least one drive, at least one extruder barrel, at least one rotatably driven extruder screw mounted in the extruder barrel, at least one material feed, at least one extrudate outlet, at least one vent zone and at least one gas outlet.

The invention further relates to a process for the devolatilization of a syrup composed of polymers, of solvents and/or of monomers, using a vented extruder.

PRIOR ART

Polymerization processes often carry out the polymerization in a solvent. The solvent here can firstly be the monomer solution itself, and/or can also be an inert solvent. To obtain the polymer, the residual monomers or the solvent have to be removed, for example via evaporation. This devolatilization usually takes place in a vented extruder. Vented extruders are also used for the production of thermoplastics, in particular if the intention is to remove residual monomers from the input plastic.

In the former usage sector of vented extruders, very large volume streams of vapour have to be dissipated and condensed in large heat exchangers, depending on the proportion by weight of solvent and/or monomers to be evaporated.

The structure of known vented extruders is usually such that the material stream to be devolatilized is introduced at the drive side of the extruder screw, and the devolatilized extrudate is conveyed towards the screw tip. Following an increase of pressure in the extruder here, there is usually a depressurization of the material at some point in the path downstream of the material feed, where the material is devolatilized at atmospheric pressure or with the aid of suction. To this end, a vented extruder usually has the screw channels deeply cut at one point, so that the pressure falls at that point to suction level or atmospheric level, permitting suction-removal of vapour and gas. Behind this vent zone, the melt is then again compressed and the pressure is again increased.

EP 0 490 359 A1 describes, by way of example, a single-screw vented extruder of the type mentioned in the introduction. A structure of the said vented extruder is as described above, and it serves to remove residual monomers from the input plastic during production of thermoplastic. To this end, an entrainer is mixed with the melt. The melt here is devolatilized in the devolatilizing section of the extruder with maximum bubble formation. The melt pressure is first increased to a value which is above the specific vapour pressure of the entrainer used. Once this has been achieved, the entrainer and the melt readily undergo liquid-phase mixing with one another, and then undergo depressurization with significant bubble formation.

However, the vented extruder disclosed in EP 0 490 359 A1 is not suitable for the devolatilization of a syrup with relatively high solvent content or with relatively high content of monomers.

In order to increase devolatilization performance, extruders are provided with continuously increased barrel and screw diameter, starting at the vent zones situated downstream of the feed point and extending as far as the screw tip. The design is described by way of example in EP 0 102 400 A1 and DE 30 268 42 A1. The enlargement of the barrel permits reduction of gas velocity. However, there is over-dimensioning of the diameter of the extruder downstream behind the vent zones. It is therefore more advantageous, for the devolatilization of a polymer syrup with high monomer and/or solvent content, to design the first vent zone so that the gas is dissipated upstream of the material feed, while the polymer is conveyed downstream. This embodiment is described by way of example in EP 0015457A1. Since gas and monomer vapours and solvent vapours are dissipated between material feed and gearbox, increased cost has to be incurred here for sealing between the extruder barrel and the screw shaft, to prevent gas output in the direction of the gearbox.

Another solution proposed for solving the problem of sealing in the direction of the gearbox, alongside a sliding-ring seal, is flushing of the space prior to the gearbox with inert gas. This embodiment is described in JP 2003 348300. However, a disadvantage of this proposed solution is that a large stream of inert gas is needed if the streams of monomer and/or solvent are large. This embodiment therefore leads to high operating costs and capital expenditure, since the inert gas in the monomer and/or solvent gas reduces heat transfer during condensation of the said gases. Large heat-transfer surfaces are therefore needed.

Object

An object underlying the invention is therefore to design a vented extruder of the type described above in such a way that, given a stream of syrup with relatively high content of solvent and monomer, it can have maximum effectiveness in removing solvent and monomer from the polymer via evaporation, thus permitting production of polymers with very small residual amounts of solvent and/or monomer. To simplify the terminology, the term "solvents" is intended to include the monomers.

In particular, the intention is, given high throughput with high solvent content, to prevent entrainment of polymer with the gas stream and to prevent either monomer or solvent or polymer from reaching the gearbox.

Achievement of Object

The object is firstly achieved via a vented extruder for the devolatilization of a polymer material, encompassing at least one drive, at least one extruder barrel, at least one rotatably driven extruder screw mounted in the extruder barrel, at least one material feed, at least one extrudate outlet, at least one vent zone and at least one gas outlet, where a particular feature of the vented extruder according to the invention is that the drive has been provided in the region of that end of the extruder screw that is downstream in relation to the direction of conveying of the polymer. An advantage of this design is that it enables most of the gas arising in the vent zone to be dissipated at the direction opposite to the direction of conveying of the polymer material. This permits sealing of the drive only with respect to polymeric material, the viscosity of which is higher than that of monomer and solvent. Furthermore, the sealing of the drive does not have to be resistant toward the solvent used.

In one particularly advantageous design of the vented extruder according to the invention, the gas output for at least a portion of the gas arising in the vent zone has been provided upstream of the material feed, in relation to the direction of the conveying of the polymer material, so that the gas can be dissipated in the region of the screw tip in countercurrent to the polymer stream.

Any monomer and/or solvent still present in the polymer material can be subjected to further devolatilization downstream in one or more vent zones.

In other words, the invention provides that, unlike in the prior art, the gas stream is conducted upstream in the direction of the screw tip in opposition to the direction of conveying of the polymer. Gas output at that point can take place at the end of and/or radially from and/or tangentially from the extruder barrel. The polymer is conveyed out of the vent zone in the direction opposite to the direction of evaporation. This ensures particularly effective separation of polymer, monomer and/or solvent at relatively high throughput.

In one preferred variant of the vented extruder according to the invention, a condensation chamber has been provided immediately downstream of the gas output (i.e. for example directly attached by a flange). By virtue of condensation immediately at the gas output of the extruder barrel it becomes possible to omit large-volume lines for dissipation of the vapours. It is also possible to introduce the gas into a condensation device by way of unheated or heated pipelines.

It is preferable that the gas output has been provided at the upstream end of the extruder barrel in the region of the screw tip. By way of example, the end of the extruder barrel upstream can be opened in such a way that the free end of the screw provides the possibility of withdrawing the extruder screw from the extruder, through the condensation chamber, without dismantling of assemblies built onto the extruder.

One particularly advantageous variant of the vented extruder provides that, in order to condense gas flowing into the condensation chamber, liquids are sprayed or injected into the condensation chamber for condensing of the gas flowing into the chamber. Large heat exchangers can be omitted by using a sprayed-liquid for condensation. This type of embodiment also permits condensation, in a small space, from syrup streams with high content of solvent and/or monomer. Any polymer that may pass into the condensation chamber by virtue of the flow of gas can be automatically dissolved and discharged by selecting a condensation liquid which is miscible with the polymer.

It is naturally also possible, additionally or solely, to condense the gas flowing into the condensation chamber in a heat exchanger attached to the condensation chamber. In this variant, the condensate (liquid) can be returned into the condensation chamber and/or otherwise dissipated.

A particularly preferred embodiment of the vented extruder according to the invention is one in which the vent zone has been provided in the region of the material feed. This is particularly advantageous when the intention is to transport the gas stream in opposition to the polymer stream. The material fed in and subject to pressure and heat is directly depressurized in the region of the material feed into the extruder, so that the evaporation of the solvent or monomer takes place in the vent zone. This produces a large volume stream of vapour, which is dissipated with minimum entrainment of polymer in the direction of the condensation chamber.

It is advantageous that the vent zone is formed via a section of the extruder barrel with increased internal diameter. The material feed here takes place in the region of the widened extruder barrel or at one of the margins of the widening, or outside the widening, if the location of the widening is upstream of the material-feed point. It is known in the prior art that the channel depth of the extruder screw can be altered or the diameter of the extruder screw core can be reduced, but this is less advantageous, since in particular the latter variant leads to a weaker extruder-screw cross section.

These two possibilities for screw modification can, of course, be used additionally.

A particular advantage of the diameter increase in the extruder barrel is that the gas velocity of the vapour is reduced, likewise reducing entrainment of polymer.

The internal diameter of the extruder barrel in the vent zone is advantageously from 1.01 to 3 times, preferably from 1.01 to 2 times and very particularly preferably from 1.01 to 1.6 times, the internal diameter of the extruder barrel outside the vent zone.

In the region of the barrel with enlarged internal diameter, fillets may additionally have been provided on the inner surface, promoting the transport of the polymer melt downstream. These are of helical design, in order to eliminate dead spots, and they lead to uniform and consistent devolatilization.

The length of the vent zone has advantageously been selected so as to be from 0.5 to 10 times, preferably from 1 to 7 times and very particularly preferably from 1 to 5 times, the internal diameter of the extruder barrel outside the vent zone.

It is particularly advantageous that the material feed has been provided at the periphery of the extruder barrel at two diametrically opposite points in the vent zone. Division of the syrup stream around the periphery of the extruder barrel ensures better transport of the vapours and of the partially devolatilized polymer out of the vent zone. Uniform use of the volume of the extruder reduces the tendency towards flow restriction in the vent zone.

It is preferable that there is at least one, preferably actuatable, feed valve provided, with which the volume flow rate of the material feed can be regulated. There are ideally two diametrically opposite feed valves provided, with which the volume flow rate of the material feed can be regulated. An advantage of this is that the metered flow rate can be adjusted to a desired value within the throughput characteristic of the valves, independently of the pressure relationships in the process.

One particularly advantageous embodiment of the vented extruder according to the invention provides that passing axially through the extruder screw there is a closed vapour channel, partially filled by a volatile liquid. The said vapour channel serves to compensate the temperature gradients of the melt in the longitudinal direction of the extruder screw. The melt temperature in the region of syrup feed is very low by virtue of the evaporation of solvent and monomer, whereas it is very high shortly prior to the outlet, as a consequence of the frictional heat derived from the extruder screw. An excessive melt temperature leads to degradation of the product, whereas a very low melt temperature impairs the conveying of the melt in the extruder.

The liquid present in the vapour channel condenses in the region of the material feed, and the heat of condensation liberated acts to prevent excessive cooling of the melt in the said region, whereas in the remaining regions of the extruder screw the liquid present in the vapour channel evaporates and thus acts to prevent overheating.

The extent of filling of the vapour channel can, for example, be from 20% by volume to 80% by volume, preferably from 30% by volume to 60% by volume, measured at the ambient temperature of about 20° C.

The object underlying the invention is moreover achieved via a process for the devolatilization of a syrup composed of polymers, of solvents and/or of monomers, using a vented extruder, characterized in that the gas stream arising during devolatilization within the extruder is conducted in opposition to the polymer stream.

It is advantageous that a major portion of the devolatilization of the syrup takes place in the region of the feed into the extruder, the first vent zone.

The amount of the monomers and/or of the solvents subjected to devolatilization in the region of the said vent zone, based on the total amounts of the monomers and/or of the solvents, is >50% by weight. The gas is discharged via a vent.

One advantageous variant of the process provides that the gas arising is condensed in a container immediately at the gas output of the extruder.

It is possible that the condensation is spray condensation, where a liquid is sprayed into, or trickled into, the system, preferably a liquid in which the polymer is soluble. However, condensation in a heat exchanger attached to the condensation chamber is also possible.

There can also be further vent zones and vents provided either downstream or upstream, these serving for residual devolatilization of the polymer.

The invention is illustrated below by using an inventive example, with the aid of the attached drawings.

Figure 2:
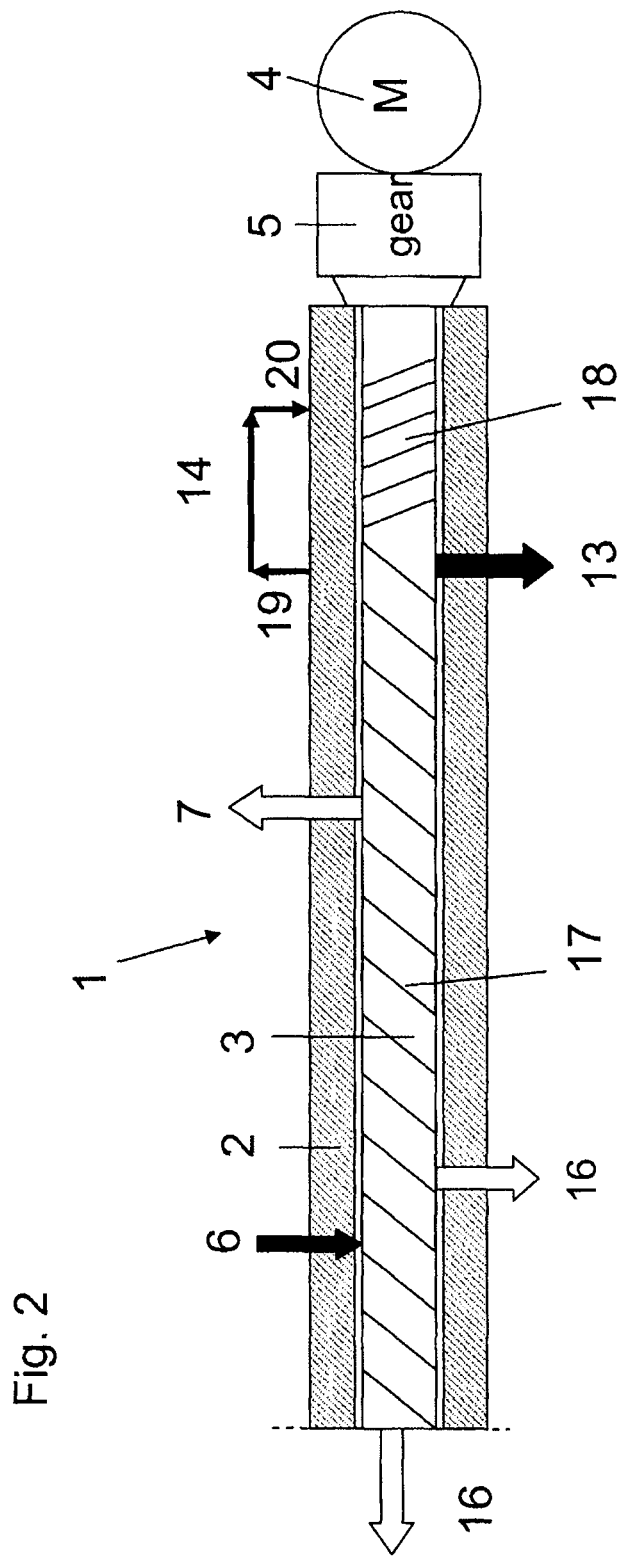

FIG. 1 is a diagram of a section of a portion of the vented extruder with a condensation chamber attached thereto and without drive, and FIG. 2 is a diagram of the vented extruder according to the invention with gearbox and motor, but without the attached condensation chamber.

FIG. 1 shows only a portion of the vented extruder (1). The vented extruder (1) encompasses an extruder barrel (2) and an extruder screw (3) rotatably mounted in the extruder barrel (2). The extruder screw (3) is rotated by a drive (4) by way of an intermediate gearbox (5). By way of example, there can be an electric motor provided as drive (4).

As mentioned above, FIG. 1 does not show the drive (4) or the gearbox (5), the location of these being on the right-hand side of the drawing. The polymer/monomer mixture is introduced to the extruder barrel (2) by way of a branching feed line (6) at two diametrically opposite points on the extruder barrel (2) by way of feed valves (7).

The vented extruder (1) according to the invention has been designed as a single-screw extruder, but this could also have been designed as a twin-screw extruder.

The cross section of the extruder barrel (2) has been widened in the region of the feed valves (7), i.e. said internal diameter is larger by about a factor of from 1.01 to 3 than the regular internal diameter of the extruder barrel (2) outside the said region. The internal diameter of the extruder barrel (2) at that point corresponds approximately to the external diameter of the screw flight of the extruder screw (3) (taking into account any tolerances). The region of larger internal diameter of the extruder barrel (2) defines the vent zone. The monomer/polymer mixture and/or a solvent/polymer mixture is fed under conditions of pressure and heat into the extruder barrel (2) by way of the feed line (6). A marked pressure reduction takes place in the vent zone (9), and the monomer and/or the solvent can therefore be removed from the polymer by devolatilization. Furthermore, the flow velocity of the material is reduced in the same region. In the drawing, the polymer is conveyed towards the right in the direction of the drive. The terms "downstream" and "upstream" used in this connection always refer to the direction of conveying of the polymer.

The invention now provides that the gas arising in the vent zone (9) or the vapour arising at that point is conveyed towards the left-hand side of the drawing, i.e. upstream of the feed valves (7).

The upstream end (10) of the extruder barrel (2) is open, and opens into a condensation chamber (11) into which the gas arising in the vent zone (9) flows.

(12) indicates introduction of a liquid by spraying, the liquid serving to cool and condense the gas/the vapour in the condensation chamber. The liquid used is advantageously miscible with the polymer, thus permitting any entrained polymer to be dissolved in the liquid. As an alternative, or in addition, other means can be used for condensation, e.g. heat exchanger/condensers.

As FIG. 2 shows, the drive 4 is downstream of the feed valves (7). This means that the polymer is conveyed from the end of the extruder/screw tip in the direction of the drive side.

As can also be seen from FIG. 2, the vented extruder (1) according to the invention has a tangential or radial extrudate outlet (13) at its end opposite to the feed point (6).

As can be seen from FIG. 1, passing axially through the extruder screw there is a closed vapour channel (15), partially filled by a volatile liquid. Evaporation of solvent or monomer leads to marked cooling of the polymer in the feed region of the extruder. The significantly cooled polymer can in turn be heated with the aid of the vapour channel along the short path, if the liquid in the vapour channel (15) condenses at that point. Alongside the heating of the extruder barrel in the feed region and the frictional heat of the extruder screw (3), the vapour channel (15) represents an additional source of heat for the (partially) devolatilized melt in the feed region of the syrup. Throughput in the extruder can thus be maximized via this embodiment. In the region of the extrudate outlet (13), evaporation within the extruder screw cools the melt or the extrudate.

Excessive frictional heat can be dissipated, thus reducing degradation of the product.

In the vented extruder (1) according to the invention, the drive (4) and the gearbox (5) have been provided at that end of the vented extruder (1) situated downstream in the direction of conveying of the polymer, i.e. the end opposite to a first material feed (6).

The extruder screw (3) encompasses a first screw-thread section (17) in which the orientation of the channel profit is such as to generate drag flow in the extruder barrel from the first material feed (6) towards the extrudate outlet (13).

The orientation of the extrudate outlet (13) of the vented extruder (1) is tangential or radial in relation to the longitudinal axis of the extruder screw (3), the polymer thus being discharged upstream of the gearbox (5) and of the drive (4).

The extruder screw (3) furthermore encompasses a second screw-thread section (18) in which the channel profile has been oriented in such a way as to achieve reverse conveying opposite to the direction of conveying of the first screw-thread section (17). The second screw-thread section (18) therefore serves for sealing on the drive side of the extruder with respect to the main flow of the polymer.

(19) indicates a flow branch deviating from the main flow of the polymer and fed by way of a by-pass (14) and a second material feed (20) into the region of the second screw-thread section (18) of the extruder barrel (2). The by-pass can run outside or inside the extruder barrel. The flow branch of polymer deviating from the main flow brings about, in the region of the second screw-thread section (18) of the extruder screw (3), constant back-flushing with fresh polymer. In this region, the polymer is conveyed from the direction of the gearbox (5) in the direction of the extrudate outlet (13). This therefore prevents any polymer residues from remaining at that point downstream of the extrudate outlet (13).

As can be seen from the drawing, the extrudate outlet (13) is approximately at the downstream end of the first screw-thread section (17).

The known type of heating is advantageously used to heat the vented extruder according to the invention.

Key
1 Vented extruder
2 Extruder barrel
3 Extruder screw
4 Drive
5 Gearbox
6 Feed line
7 Feed valves
8 Condensate run-off
9 Vent zone
10 Upstream end of vented extruder
11 Condensation chamber
12 Spray introduction
13 Extrudate outlet
14 By-pass
15 Vapour channel
16 Gas outputs
17 First screw-thread section
18 Second screw-thread section
19 Branch deviating from polymer flow
20 Second material feed

The invention claimed is:

1. A vented extruder for the devolatilization of a polymer material, encompassing at least one drive, at least one extruder barrel, at least one rotatably driven extruder screw mounted in the extruder barrel, at least one material feed, at least one extrudate outlet, at least one vent zone and at least one gas outlet,
wherein the drive has been provided in the region of that end of the extruder screw that is downstream in relation to the direction of conveying of the polymer,
wherein the gas outlet for at least a portion of the gas arising in the vent zone is positioned entirely upstream of the material feed, in relation to the direction of conveying of the polymer material, and the gas outlet is configured to conduct the gas upstream of the direction of the conveying of the polymer material.

2. The vented extruder according to claim 1, wherein
a condensation chamber has been provided immediately upstream of the gas outlet.

3. The vented extruder according to claim 1, wherein
the gas outlet has been provided at the upstream end of the extruder barrel.

4. The vented extruder according to claim 2, wherein
a means for spraying-in or injection of a liquid have been provided in the condensation chamber.

5. The vented extruder according to claim 1, wherein
the vent zone has been provided in the region of the material feed.

6. The vented extruder according to claim 1, wherein
the internal diameter of the extruder barrel in the vent zone is from 1.01 to 3 times the internal diameter of the extruder barrel outside the vent zone.

7. The vented extruder according to claim 1, wherein
the internal diameter of the extruder barrel in the vent zone is from 1.01 to 2 times the internal diameter of the extruder barrel outside the vent zone.

8. The vented extruder according to claim 1, wherein
the internal diameter of the extruder barrel in the vent zone is from 1.01 to 1.6 times the internal diameter of the extruder barrel outside the vent zone.

9. The vented extruder according to claim 1, wherein
internals have been provided in the extruder barrel in the region of the vent zone, and promote the transport of the polymer material.

10. The vented extruder according to claim 9, wherein
helical fillets have been provided as internals.

11. The vented extruder according to claim 1, wherein
the length of the vent zone is from 0.5 to 10 times the internal diameter of the extruder barrel outside the vent zone.

12. The vented extruder according to claim 1, wherein
the length of the vent zone is from 1 to 7 times the internal diameter of the extruder barrel outside the vent zone.

13. The vented extruder according to claim 1, wherein
the length of the vent zone is preferably from 1 to 5 times the internal diameter of the extruder barrel outside the vent zone.

14. The vented extruder according to claim 1, wherein
the material feed has been provided at least one site on the periphery of the extruder barrel in the vent zone.

15. The vented extruder according to claim 1, wherein
at least one feed valve has been provided.

16. The vented extruder according to claim 1, wherein
at least one feed valve has been provided, and can control the volume flow rate of the material feed.

17. The vented extruder according to claim 1, wherein
passing axially through the extruder screw there is a closed vapour channel, partially filled by a volatile liquid.

18. The vented extruder according to claim 17, wherein
the volatile liquid is water.

19. The vented extruder according to claim 17, wherein
the extent of filling of the vapour channel with the volatile liquid or water is from 20% by volume to 80% by volume, measured at the ambient temperature of about 20° C.

20. The vented extruder according to claim 17, wherein
the extent of filling of the vapour channel with the volatile liquid or water is from 30% by volume to 60% by volume, measured at the ambient temperature of about 20° C.

21. A process for the devolatilization of a syrup composed of a polymer, of solvents a monomer, or a combination thereof, the process comprising providing the syrup to the vented extruder according to claim 1,
wherein the gas stream arising during devolatilization within the extruder is conducted in opposition to the polymer stream.

22. The process according to claim 21, wherein
gas arising from the devolatization is condensed in a condensation chamber immediately at the gas outlet of the extruder.

23. The process according to claim 22, wherein
the condensation is spray condensation, where a liquid is sprayed into, or trickled into, the vented extruder.

24. The process according to claim 22, wherein
the condensation is achieved via a heat exchanger.

25. The process according to claim 21, wherein
the syrup is devolatilized in the region of the feed into the extruder.

26. The process according to claim 21, wherein
the extent of devolatilization of the syrup in the devolatilization is greater than 50% by weight, based on the total amount of the monomers and/or of the solvent.

27. The vented extruder according to claim 1, wherein the vent zone is formed via a section of the extruder barrel with increased internal diameter.

\* \* \* \* \*